United States Patent
Chelarescu et al.

(10) Patent No.: US 11,308,207 B2
(45) Date of Patent: Apr. 19, 2022

(54) USER VERIFICATION OF MALWARE IMPACTED FILES

(71) Applicant: Microsoft Technology Licensing, LLC, Redmond, WA (US)

(72) Inventors: Filip Chelarescu, Kirkland, WA (US); Benjamin N. Truelove, Lynnwood, WA (US); Meir E. Abergel, Redmond, WA (US); Parthipan Thayanithy, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 454 days.

(21) Appl. No.: 15/941,219

(22) Filed: Mar. 30, 2018

(65) Prior Publication Data

US 2019/0303571 A1 Oct. 3, 2019

(51) Int. Cl.
*G06F 21/56* (2013.01)
*G06F 21/55* (2013.01)
(Continued)

(52) U.S. Cl.
CPC ........ *G06F 21/565* (2013.01); *G06F 11/1451* (2013.01); *G06F 16/1734* (2019.01);
(Continued)

(58) Field of Classification Search
CPC ............... G06F 21/565; G06F 16/1734; G06F 11/1451; G06F 21/554; G06F 21/56;
(Continued)

(56) References Cited

U.S. PATENT DOCUMENTS

| 7,607,169 | B1 | 10/2009 | Njemanze et al. |
| 7,624,443 | B2 | 11/2009 | Kramer et al. |

(Continued)

FOREIGN PATENT DOCUMENTS

| CN | 105122216 A | 12/2015 |
| CN | 106570396 A | 4/2017 |

(Continued)

OTHER PUBLICATIONS

"Data Backup and Recovery", Retrieved from«https://web.archive.org/web/20170415143651/https://www.pcrisk.com/how-to-remove-spyware/data-backup-and-recovery», Apr. 15, 2017, 4 Pages.
(Continued)

*Primary Examiner* — Kevin Bechtel
*Assistant Examiner* — Forrest L Carey
(74) *Attorney, Agent, or Firm* — Schwegman Lundberg & Woessner, P.A.

(57) ABSTRACT

A cloud storage server accesses a plurality of server-stored files of a cloud storage account of a client device. The cloud storage server determines that one or more server-stored files from the plurality of server-stored files are affected by a malware activity. The cloud storage server generates a graphical user interface that includes a detection notification and a confirmation request, the detection notification indicating a detected presence of malware in the one or more server-stored files and metadata corresponding to the one or more server-stored files, the confirmation request indicating a request for the client device to confirm the detected presence of malware in the one or more server-stored files. A confirmation response is received from the client device. The confirmation response identifies at least one of the one or more server-stored files and confirming the presence of malware activity in the identified server-stored files.

20 Claims, 10 Drawing Sheets

(51) Int. Cl.
*H04L 29/06* (2006.01)
*G06F 11/14* (2006.01)
*G06F 16/17* (2019.01)

(52) U.S. Cl.
CPC ............ *G06F 21/554* (2013.01); *G06F 21/56* (2013.01); *G06F 21/568* (2013.01); *H04L 63/145* (2013.01); *H04L 63/1416* (2013.01); *H04L 63/1441* (2013.01)

(58) Field of Classification Search
CPC ............... G06F 21/568; H04L 63/1416; H04L 63/1441; H04L 63/145
See application file for complete search history.

(56) References Cited

U.S. PATENT DOCUMENTS

| | | |
|---|---|---|
| 7,756,834 B2 | 7/2010 | Masters et al. |
| 7,784,098 B1 | 8/2010 | Fan et al. |
| 8,245,301 B2 | 8/2012 | Evans et al. |
| 8,468,604 B2 | 6/2013 | Claudatos et al. |
| 8,484,737 B1 | 7/2013 | Swift et al. |
| 8,667,583 B2 | 3/2014 | Polyakov et al. |
| 8,813,222 B1 | 8/2014 | Codreanu et al. |
| 8,875,294 B2 | 10/2014 | Golavanov |
| 8,881,282 B1 | 11/2014 | Aziz et al. |
| 8,931,107 B1 | 1/2015 | Brandwine |
| 9,317,686 B1 | 4/2016 | Ye et al. |
| 9,405,902 B1 | 8/2016 | Xavier |
| 9,411,955 B2 | 8/2016 | Jakobsson |
| 9,514,309 B1 | 12/2016 | Mann |
| 9,680,845 B2 | 6/2017 | Langton et al. |
| 9,734,337 B1 | 8/2017 | Patton et al. |
| 9,756,061 B1 | 9/2017 | Roeh et al. |
| 9,792,436 B1 | 10/2017 | Sankruthi |
| 9,838,405 B1 | 12/2017 | Guo et al. |
| 9,852,289 B1 | 12/2017 | Mann |
| 10,007,795 B1 | 6/2018 | Chung et al. |
| 10,009,360 B1 | 6/2018 | Todd et al. |
| 10,055,582 B1 | 8/2018 | Weaver et al. |
| 10,140,454 B1 | 11/2018 | Spath et al. |
| 10,187,410 B2 | 1/2019 | Greenberg et al. |
| 10,409,986 B1 | 9/2019 | Nantanzon et al. |
| 10,447,546 B1 | 10/2019 | Guo et al. |
| 10,685,114 B2 | 6/2020 | Scaife et al. |
| 2006/0137010 A1 | 6/2006 | Kramer et al. |
| 2007/0006304 A1 | 1/2007 | Kramer et al. |
| 2009/0002370 A1 | 1/2009 | Helfman |
| 2009/0144410 A1 | 6/2009 | Fink et al. |
| 2011/0067106 A1 | 3/2011 | Evans et al. |
| 2011/0078497 A1 | 3/2011 | Lyne et al. |
| 2011/0082838 A1 | 4/2011 | Niemela |
| 2011/0231291 A1 | 9/2011 | Yankovich et al. |
| 2011/0261049 A1 | 10/2011 | Cardno et al. |
| 2012/0124007 A1 | 5/2012 | Sten et al. |
| 2012/0137238 A1 | 5/2012 | Abeln |
| 2013/0024435 A1 | 1/2013 | Poirier et al. |
| 2013/0067576 A1 | 3/2013 | Niemela |
| 2013/0086683 A1 | 4/2013 | Thomas et al. |
| 2013/0125051 A1 | 5/2013 | Kelley et al. |
| 2014/0047544 A1 | 2/2014 | Jakobsson |
| 2014/0095428 A1 | 4/2014 | Beresniewicz et al. |
| 2014/0130161 A1 | 5/2014 | Golovanov |
| 2015/0172304 A1 | 6/2015 | Kleczynski |
| 2015/0178171 A1 | 6/2015 | Bish et al. |
| 2016/0041778 A1 | 2/2016 | Li et al. |
| 2016/0124665 A1 | 5/2016 | Jain et al. |
| 2016/0164894 A1 | 6/2016 | Zeitlin et al. |
| 2016/0294851 A1 | 10/2016 | Langton et al. |
| 2017/0020353 A1 | 1/2017 | Park et al. |
| 2017/0032279 A1* | 2/2017 | Miserendino ............ G06N 5/04 |
| 2017/0140156 A1 | 5/2017 | Gu et al. |
| 2017/0141975 A1 | 5/2017 | John et al. |
| 2017/0177867 A1 | 6/2017 | Crofton et al. |
| 2017/0180394 A1 | 6/2017 | Crofton et al. |
| 2017/0206353 A1 | 7/2017 | Jai et al. |
| 2017/0223031 A1 | 8/2017 | Gu et al. |
| 2017/0270293 A1 | 9/2017 | Gu et al. |
| 2017/0324755 A1 | 11/2017 | Dekel et al. |
| 2017/0329965 A1 | 11/2017 | Dodson |
| 2017/0337194 A1 | 11/2017 | Gilchrist et al. |
| 2017/0364681 A1 | 12/2017 | Roguine et al. |
| 2017/0371547 A1 | 12/2017 | Fruchtman et al. |
| 2018/0007069 A1 | 1/2018 | Hunt et al. |
| 2018/0018458 A1 | 1/2018 | Schmugar et al. |
| 2018/0020013 A1* | 1/2018 | Yoshikawa ............. G06F 21/56 |
| 2018/0024893 A1* | 1/2018 | Sella ...................... G06N 7/005 |
| | | 707/648 |
| 2018/0027009 A1 | 1/2018 | Santos et al. |
| 2018/0034835 A1 | 2/2018 | Iwanir et al. |
| 2018/0048658 A1 | 2/2018 | Hittel et al. |
| 2018/0101678 A1 | 4/2018 | Rosa |
| 2018/0181761 A1 | 6/2018 | Sinha et al. |
| 2018/0189488 A1 | 7/2018 | Arora et al. |
| 2018/0189490 A1 | 7/2018 | Maciejak et al. |
| 2018/0203997 A1 | 7/2018 | Charters et al. |
| 2018/0204000 A1* | 7/2018 | Charters ............... G06F 21/568 |
| 2018/0211038 A1 | 7/2018 | Breiman et al. |
| 2018/0212987 A1 | 7/2018 | Tamir et al. |
| 2018/0248896 A1 | 8/2018 | Challita et al. |
| 2018/0293379 A1 | 10/2018 | Dahan |
| 2018/0307839 A1 | 10/2018 | Bhave et al. |
| 2018/0357133 A1 | 12/2018 | Strogov et al. |
| 2018/0375826 A1 | 12/2018 | Chang et al. |
| 2019/0065745 A1 | 2/2019 | Araujo et al. |
| 2019/0068627 A1 | 2/2019 | Thampy |
| 2019/0109870 A1 | 4/2019 | Bedhapudi et al. |
| 2019/0130097 A1 | 5/2019 | Berler et al. |
| 2019/0138727 A1 | 5/2019 | Dontov et al. |
| 2019/0158512 A1 | 5/2019 | Zhang |
| 2019/0201597 A1 | 7/2019 | Shelton et al. |
| 2019/0205530 A1* | 7/2019 | Brown .................. G06F 21/552 |
| 2019/0228148 A1 | 7/2019 | Pohl et al. |
| 2019/0228153 A1 | 7/2019 | Scaife et al. |
| 2019/0303572 A1 | 10/2019 | Chelarescu et al. |
| 2019/0303573 A1 | 10/2019 | Chelarescu et al. |
| 2019/0303575 A1 | 10/2019 | Chelarescu et al. |
| 2019/0306179 A1 | 10/2019 | Chelarescu et al. |
| 2019/0347415 A1* | 11/2019 | Yavo ..................... G06F 21/554 |
| 2019/0347419 A1 | 11/2019 | Geng |
| 2020/0019303 A1 | 1/2020 | Truelove et al. |

FOREIGN PATENT DOCUMENTS

| | | |
|---|---|---|
| WO | 2017053745 A1 | 3/2017 |
| WO | 2018004891 A1 | 1/2018 |

OTHER PUBLICATIONS

"Eset vs. Crypto-ransomware", In White Paper of ESET, Retrieved on: Feb. 7, 2018, 9 Pages.

"Non Final Office Action Issued in U.S. Appl. No. 15/942,009", dated Apr. 29, 2020, 22 Pages.

"Notice of Allowance Issued in U.S. Appl. No. 16/036,636", dated Apr. 2, 2020, 14 Pages.

"Final Office Action Issued in U.S. Appl. No. 16/036,636", dated Jan. 10, 2020, 18 Pages.

"Non Final Office Action Issued in U.S. Appl. No. 16/036,636", dated Jun. 27, 2019, 17 Pages.

"Non Final Office Action Issued in U.S. Appl. No. 15/941,243", dated Feb. 6, 2020, 21 Pages.

"Non Final Office Action Issued in U.S. Appl. No. 15/941,710", dated Mar. 6, 2020, 14 Pages.

"Non Final Office Action Issued in U.S. Appl. No. 15/941,840", dated Mar. 4, 2020, 14 Pages.

"International Search Report and Written Opinion Issued in PCT Patent Application No. PCT/US19/023770", dated Jun. 25, 2019, 10 Pages.

"International Search Report and Written Opinion Issued in PCT Patent Application No. PCT/US19/023771", dated Jun. 25, 2019, 10 Pages.

(56) References Cited

OTHER PUBLICATIONS

"International Search Report and Written Opinion Issued in PCT Patent Application No. PCT/US19/023775", dated Jun. 25, 2019, 10 Pages.
"Client Server Security", Retrieved from: http://docs.trendmicro.com/all/smb/css/v3.6/en-us/css_3.6_gsg.pdf, Mar. 1, 2007, 93 Pages.
Schmidt, Ricardo, "Tracking suspicious activity on AWS", Retrieved from: https://amaysim.engineering/tracking-suspicious-activity-on-aws-299a943f3e23, Feb. 13, 2018, 16 Pages.
"File Type Detection And Filtration Overview", Retrieved from: https://onlinehelp.opswat.com/corev3/2.4.4._File_Type_Detection_And_Filtration_Overview.html, Retrieved Date: Feb. 5, 2018, 3 Pages.
"Nextcloud presents Ransomware Protection app", Retrieved from: https://help.nextcloud.com/t/nextcloud-presents-ransomware-protection-app/19255, Aug. 8, 2017, 6 Pages.
D-Souza-Wiltshire, et al., "Configure the notifications that appear on endpoints", Retrieved from: https://docs.microsoft.com/en-us/windows/threat-protection/windows-defender-antivirus/configure-notifications-windows-defender-antivirus, Oct. 31, 2017, 5 Pages.
Hatem, et al., "Malware Detection in Cloud Computing", In Journal of International Journal of Advanced Computer Science and Applications, vol. 5, Issue 4, Jul. 17, 2015, pp. 187-192.
Muthurajkumar, et al., "Agent Based Intelligent Approach for the Malware Detection for Infected Cloud Data Storage Files", In Proceedings of Seventh International Conference on Advanced Computing, Dec. 15, 2015, pp. 1-5.
"International Search Report and Written Opinion Issued in PCT Application No. PCT/US2019/023772", dated May 7, 2019, 12 Pages.
"International Search Report and Written Opinion Issued in PCT Application No. PCT/US2019/023776", dated May 14, 2019, 13 Pages.
"Notice of Allowance Issued in U.S. Appl. No. 15/941,710", dated Jul. 30, 2020, 19 Pages.
"Final Office Action Issued in U.S. Appl. No. 15/941,840", dated Jul. 30, 2020, 17 Pages.
"Final Office Action Issued in U.S. Appl. No. 15/942,009", dated Aug. 31, 2020, 23 Pages.
"Non Final Office Action Issued in U.S. Appl. No. 15/941,840", dated Nov. 20, 2020, 15 Pages.
"Notice of Allowance Issued in U.S. Appl. No. 15/942,009", dated Dec. 3, 2020, 14 Pages.
"Notice of Allowance Issued in U.S. Appl. No. 15/941,840", dated Apr. 8, 2021, 9 Pages.
Gonzalez, et al., "Detection and Prevention of Crypto-Ransomware", In IEEE 8th Annual Ubiquitous Computing, Electronics and Mobile Communication Conference (UEMCON), Oct. 19, 2017, pp. 472-478.
"Notice of Allowance Issued in U.S. Appl. No. 15/941,840", dated Aug. 26, 2021, 9 Pages.
El-Kosairy, et al., "Intrusion and Ransomware Detection System", In Proceedings of the 1st International Conference on Computer Applications & Information Security, Apr. 4, 2018, 7 Pages.

* cited by examiner

USER VERIFICATION OF MALWARE IMPACTED FILES

TECHNICAL FIELD

The subject matter disclosed herein generally relates to a special-purpose machine that detects malware impacted files stored in a cloud storage system and improves the detection of malware impacted files using feedback from users of the cloud storage system, including computerized variants of such special-purpose machines and improvements to such variants, and to the technologies by which such special-purpose machines become improved compared to other special-purpose machines that detect ransomware. Specifically, the present disclosure addresses systems and methods that detect a malware impacted file in a cloud storage system, provide impacted file metadata to a client device, and receive a confirmation of the malware from a user at the client device.

BACKGROUND

Conventionally, a ransomware attack on a computer modifies some files stored on the computer by encrypting the files' content and holding the encrypted files for ransom. A user of the computer may not have other recourse to recover the encrypted files besides paying the ransom. If the ransom is not paid within a specified time, the files are permanently lost.

BRIEF DESCRIPTION OF THE DRAWINGS

Some embodiments are illustrated by way of example and not limitation in the figures of the accompanying drawings.

DETAILED DESCRIPTION

Figure 1:
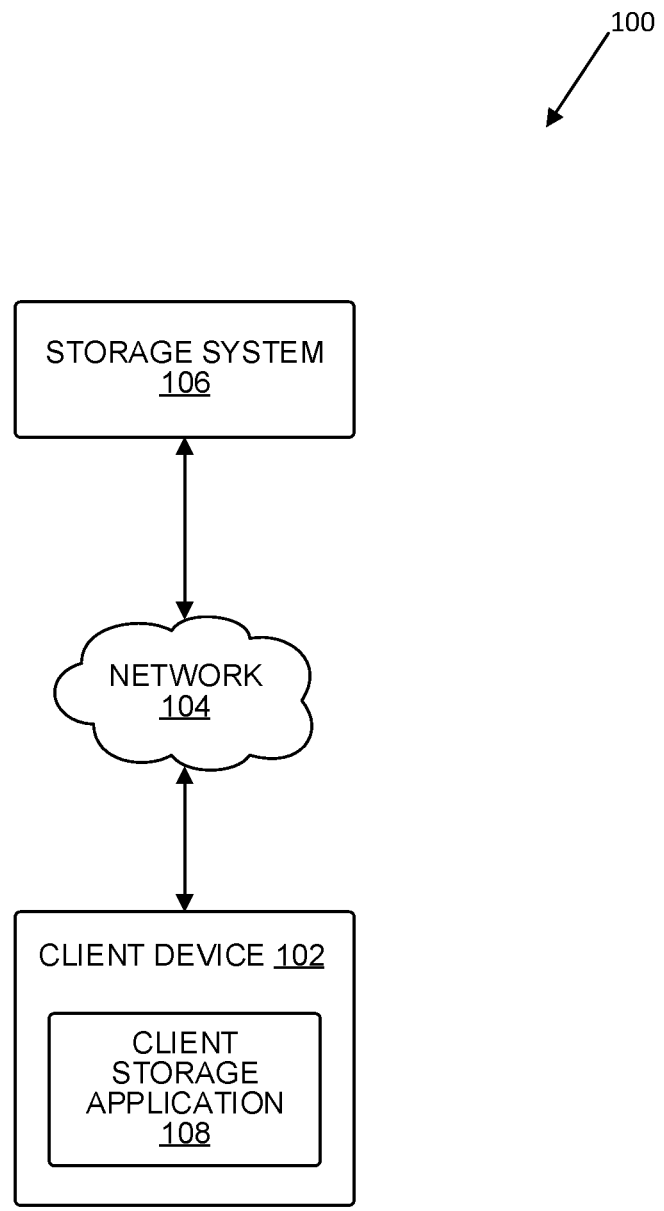
FIG. 1 is a block diagram illustrating an example environment for detecting malware impacted files, in accordance with an example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example methods (e.g., algorithms) and systems (e.g., special-purpose machines) that detect and identify malware impacted files stored in a cloud storage system and provide detection notification with metadata to a client device of the cloud storage system are described. The files stored in a server (also referred to as cloud storage server) of the cloud storage system are synced to a drive or folder at a corresponding client device registered with the cloud storage server. The cloud storage system performs a series of tests on individual files (and heuristics for several files) in the cloud storage account of the client device to identify suspicious files. Examples of tests include detecting whether a previously un-encrypted file is now encrypted, detecting whether a file has been renamed with a file extension or naming pattern associated with malware, detecting whether a content of the file matches with a type of content identified by the name extension of the file, and using machine learning based on user feedback to determine whether the file is impacted with malware. Once the file has been confirmed as being impacted by malware, the cloud storage server generates a graphical user interface that notifies the user of the suspicious files and requests the user to indicate and confirm which suspicious files have indeed been compromised. The graphical user interface presents metadata for the suspicious files (e.g., file name, the person who modified the file, the device that modified the file, the application that modified the file, the time period of the modification, and whether the file is shared with other users of the cloud server storage). In one example embodiment, the user of the client device reviews the metadata, opens or previews the files, or performs more advanced features such as file diffing to determine whether the suspicious files have indeed been compromised.

In accordance with example embodiments, a cloud storage server accesses a plurality of server-stored files of a cloud storage account of a client device. The cloud storage server determines that one or more server-stored files from the plurality of server-stored files are affected by a malware activity. The cloud storage server generates a graphical user interface that includes a detection notification and a confirmation request, with the detection notification indicating a detected presence of malware in the one or more server-stored files and metadata corresponding to the one or more server-stored files, and the confirmation request indicating a request for the client device to confirm the detected presence of malware in the one or more server-stored files. A confirmation response is received from the client device. The confirmation response identifies at least one of the one or more server-stored files and confirms the presence of malware activity in the identified server-stored files.

As a result, one or more of the methodologies described herein facilitate solving the technical problem of identifying which files stored in a cloud storage server are affected by malware, generating a graphical user interface identifying the suspicious files, and verifying the presence of the malware in the suspicious files based on a user input on the graphical user interface. As such, one or more of the methodologies described herein may obviate a need for certain efforts or computing resources that otherwise would be involved in generating false positives of malware detection in the files. As a result, resources used by one or more machines, databases, or devices (e.g., within the environment) may be reduced. Examples of such computing resources include processor cycles, network traffic, memory usage, data storage capacity, power consumption, network bandwidth, and cooling capacity.

FIG. 1 is a block diagram illustrating an example environment 100 for environment for detecting malware impacted files, in accordance with an example embodiment. In example embodiments, a storage system 106 stores copies of files from a client device 102. The storage system 106 will be discussed in more detail in connection with FIG. 2 below.

The storage system 106 is coupled, via a network 104, to one or more client devices (e.g., client device 102). One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

The client device 102 includes a client storage application 108 configured to communicate files (e.g., send and receive versions of files) or modifications in the files with the storage system 106. For example, the client storage application 108 syncs local files stored in a preset directory or folder at the client device 102 with a corresponding direction or folder at the storage system 106. Therefore, changes made to a local file in the preset folder of the client device 102 are propagated to a corresponding remote file (a copy of the local file) in the storage system 106. In one example, the client storage application 108 registers the client device 102 with the storage system 106 and communicates copies of the user-selected local files at the client device 102 at the storage system 106. In another example, changes made to a remote file at the storage system 106 are propagated to a corresponding local file in the client device 102.

In one example embodiment, the storage system 106 detects whether a modified file stored at the storage system is impacted (or also referred to as infected) by malware (or ransomware which is a type of malware). The storage system 106 generates a GUI that provides a notification to the client storage application 108 of the suspicious files and requests a confirmation from the client device 102 of which files are indeed impacted by malware. The notification provides the client device 102 with pertinent information such as the file name, the user who modified the file, the device that modified the file, the application that modified the file, the time of the modification, and whether the file is shared with other client devices.

The storage system 106 operates on the confirmed suspicious files to restore them to corresponding non-impacted versions of the confirmed suspicious files. Furthermore, the storage system 106 uses the feedback (e.g., validation/ confirmation) to provide additional reference data to a learning engine to increase its accuracy of detecting future malware activity at the storage system 106 and avoiding false positives.

The client device 102 comprises, but is not limited to, a smartphone, tablet, laptop, multi-processor system, microprocessor-based or programmable consumer electronics, game console, set-top box, or any other device that a user utilizes to communicate over the network 104. In example embodiments, the client device 102 comprises a display module (not shown) to display information (e.g., in the form of specially configured user interfaces). In some embodiments, the client device 102 may comprise one or more of a touch screen, camera, keyboard, microphone, and Global Positioning System (GPS) device.

Any of the systems or machines (e.g., databases, devices, servers) shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 10, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or machines illustrated in FIG. 1 may be combined into a single system or machine, and the functions described herein for any single system or machine may be subdivided among multiple systems or machines. Additionally, any number and type of client device 102 may be embodied within the environment 100. Furthermore, some components or functions of the environment 100 may be combined or located elsewhere in the environment 100. For example, some of the functions of the client storage application 108 may be embodied at the storage system 106.

Figure 2:
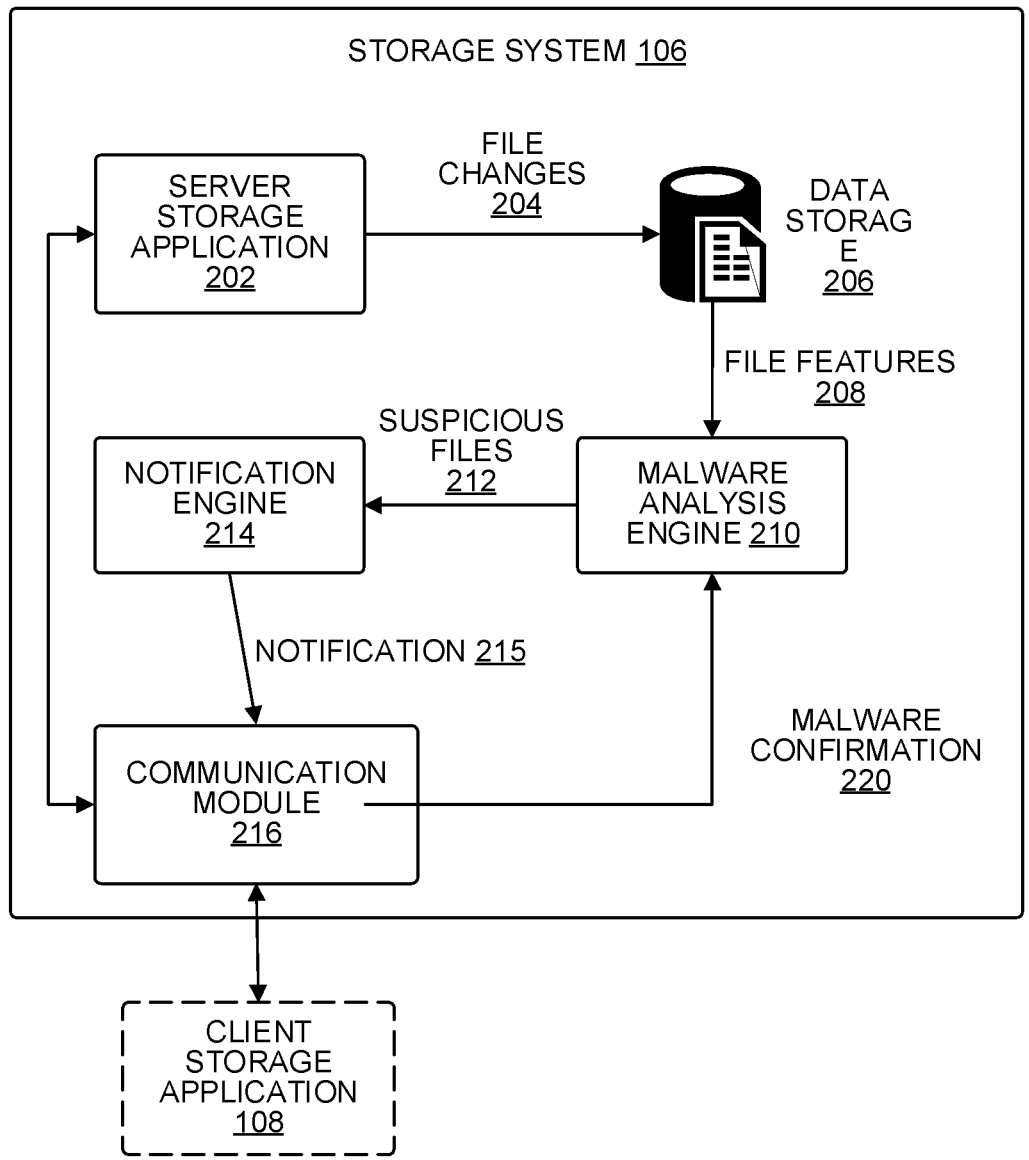
FIG. 2 is a block diagram illustrating components within a storage system, in accordance with an example embodiment.

FIG. 2 is a block diagram illustrating components within a storage system in accordance with an example embodiment. In example embodiments, the storage system 106 performs operations to detect and identify malware impacted files stored in the storage system 106, generate a GUI to provide notification and receive confirmation from the client device 102, and improve the detection of malware using feedback (e.g., confirmation) from the user of the client device 102. To enable these operations, the storage system 106 comprises a server storage application 202, a data storage 206, a malware analysis module 210, a notification engine 214, and a communication module 216, all of which are configured to communicate with each other (e.g., over a bus, shared memory, or a switch), in accordance with an example embodiment.

The server storage application 202 is configured to interface and communicate with the client storage application 108 via the communication module 216. The server storage application 202 receives a new or modified file (e.g., file changes 204) from the client storage application 108. The server storage application 202 may also receive a request from the client storage application 108 to add the new file in the data storage 206 or to replace an existing corresponding file with the modified file in the data storage 206.

In other example embodiments, the server storage application 202 receives and sends copies of files between the storage system 106 and the client device 102. In one example, the server storage application 202 is configured with the client storage application 108 to store one or more versions of copies of files received from the client storage application 108. For example, the server storage application 202 registers the client storage application 108 and forms a folder or a directory (that corresponds to a user-selected folder or directory at the client device 102) at the storage system 106. Therefore, any changes to a file in the folder at the client device 102 is replicated to the corresponding file in the corresponding folder at the storage system 106. In another example embodiment, the server storage application 202 identifies historical changes to a file stored at the storage system 106 based on the different versions of a file received from the client storage application 108. The server storage application 202 stores file changes 204 (e.g., a new file or a modified file) in the data storage 206.

The data storage 206 is configured to store the files (e.g., new or modified file 204) received from the server storage application 202. The files may be copies of files stored at the local device 102. In one example, the data storage 206 is configured to store several versions of the files based on the date and time of the different versions of the files. The files may include attributes such as file name, file extension, and size. Those of ordinary skills in the art will recognize that the files can include other different types of attributes.

In example embodiments, the data storage 206 is configured to store files and user information for individual users in user specific data stores or databases (hereinafter collectively referred to as a "user data structure" or "storage account"). For instance, each user data structure may correspond to a folder and/or a directory of the client device 102 of a user. While the data storage 206 is shown to be a part of the storage system 106, in some embodiments, the data storage 206 may be located elsewhere in the environment 100 and be communicatively coupled to the storage system 106. Additionally, any number of data storage 206 may be used to store the user data structures.

In example embodiments, the data storage 206 provides file features 208 of the new or modified file (e.g., based on file changes 204 received from the server storage application 202) or file features 208 of all the files associated with the client storage application 108 to the malware analysis engine 210. In another example embodiment, the data storage 206 provides stored copies of the new or modified file to the malware analysis engine 210.

The malware analysis engine 210 performs a series of tests on: (1) the new or modified file, (2) the file features of the new or modified file, or (3) the file features of all files of a storage account associated with the client storage application 108 to detect whether the files in the storage account is impacted with malware. The malware analysis engine 210 will be discussed in more detail in connection with FIG. 3 below. Once the malware analysis engine 210 determines that one or more files in the storage account is impacted with malware, the malware analysis engine 210 provides an identification of the suspicious files 212 to the notification engine 214.

The notification engine 214 generates a notification 215 that identifies the suspicious files and requests a user of the client storage application 108 to confirm and validate whether the suspicious files are impacted with malware. The notification 215 includes, for example, an identification of the suspicious files 212, a time of the suspected infection, a version of the suspicious file 212, an identification of who last modified the suspicious file 212, an identification of the name of the suspected malware, an identification of suspicious changes in the name or content of the suspicious file 212, an identification of which user, which device, and which application modified the suspicious files, an identification of a time of modification, and whether the suspicious files are shared with other client devices registered with the storage system 106 The notification engine 214 provides the notification 215 to the communication module 216.

The communication module 216 is configured to exchange communications with the client device 102. For example, the communication module 216 transmits the notification 215 to the client storage application 108. The communication module 216 receives a malware confirmation 220 from the client storage application 108. The malware confirmation 220 indicates a user (of the client device 102) confirmation of which suspicious files 212 are impacted with malware. The communication module 216 forwards the user feedback (e.g., malware confirmation 220) to the malware analysis engine 210 and server storage application 202 (and data storage 206).

In other example embodiments, the communication module 216 includes a user interface module (not shown) that is configured to cause presentation of the GUI generated by the malware analysis engine 210 on the client device 102. The GUI includes a visual indication of the malware-impacted file and other metadata pertinent information (e.g., time of infection, last modified author/device, size change). The user interface module generates and transmits instructions to the client storage application 108 to render and display the user interfaces.

Any one or more of the components (e.g., modules, engines) described herein may be implemented using hardware alone (e.g., one or more processors of a machine) or a combination of hardware and software. For example, any component described herein may physically include an arrangement of one or more of the processors or configure a processor (e.g., among one or more processors of a machine) to perform the operations described herein for that module. Accordingly, different components described herein may include and configure different arrangements of the processors at different points in time or a single arrangement of the processors at different points in time. Each component (e.g., module) described herein is an example of a means for performing the operations described herein for that component. Moreover, any two or more of these components may be combined into a single component, and the functions described herein for a single component may be subdivided among multiple components. Furthermore, according to various example embodiments, components described herein as being implemented within a single machine, database, or device may be distributed across multiple machines, databases, or devices. The storage system 106 may comprise other components not pertinent to example embodiments that are not shown or discussed. Further still, one or more of the components of the storage system 106 may be located at one or more of the client devices.

Figure 3:
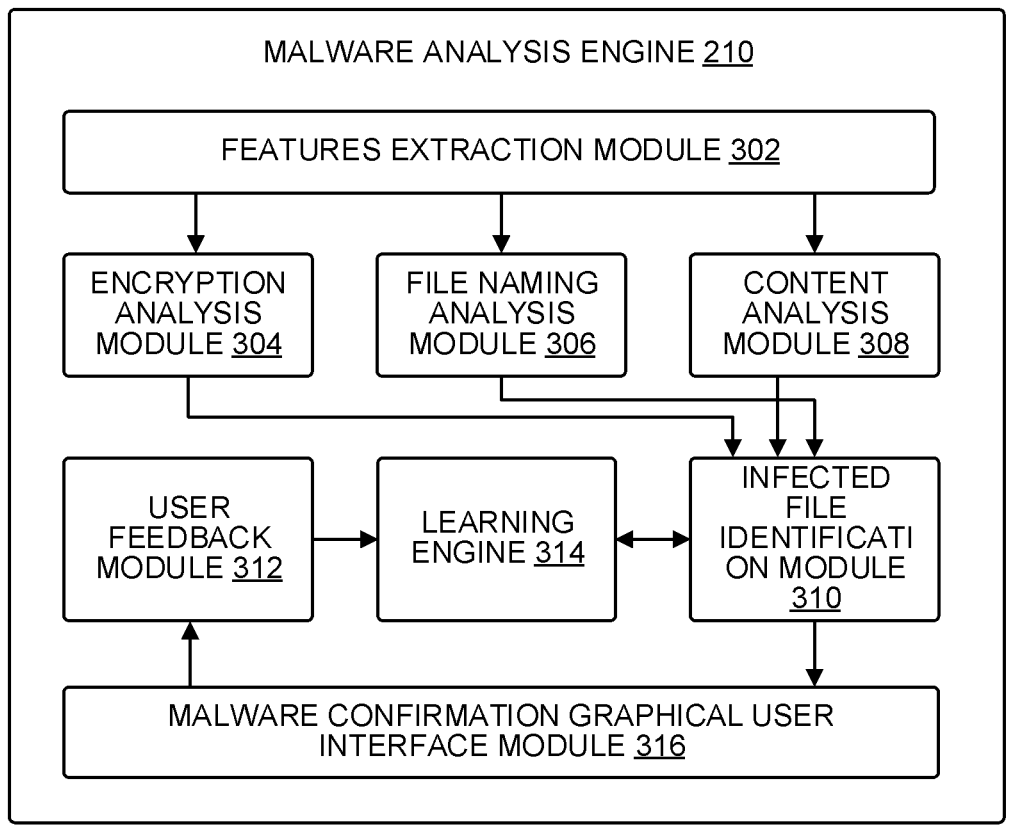
FIG. 3 is a block diagram illustrating components within a malware analysis engine, in accordance with an example embodiment.

FIG. 3 is a block diagram illustrating components within a malware analysis engine, in accordance with an example embodiment. The malware analysis engine 210 performs operations to detect and identify malware impacted files stored in the data storage 206 and to improve the detection of malware using feedback validation from users of the data storage 206 by providing metadata information in a GUI. To enable these operations, the malware analysis engine 210 comprises a feature extraction module 302, an encryption analysis module 304, a file naming analysis module 306, a content analysis module 308, a user feedback module 312, a learning engine 314, an impacted file identification module 310, and a malware confirmation GUI module 316, all of which are configured to communicate with each other (e.g., over a bus, shared memory, or a switch) in accordance with an example embodiment.

The feature extraction module 302 extracts features from a file stored at the data storage 206. In one example, the feature extraction module 302 extracts features from a last modified file or a new file received from the client storage application 108 via the server storage application 202. Examples of features (also referred to as attributes or properties in the present document) include, but are not limited to, attributes of the files such as file encryption status, extension name, date of creation, date of modification, versioning number, author name, type of media, and compression status.

The encryption analysis module 304 determines the encryption status of the new or modified file based on the extracted features of the file. For example, the encryption analysis module 304 determines that the encryption status of the modified file has changed (e.g., from non-encrypted to encrypted: a modified file is now encrypted whereas a previous version of the corresponding file is unencrypted). In another example, the encryption analysis module 304 determines that the new file is encrypted. The encryption analysis module 304 provides the encryption status of the new or modified file to the impacted file identification module 310.

The file naming analysis module 306 determines a name of the new or modified file and the name of the extension of the new or modified file based on the extracted features of the new or modified file. For example, the file naming analysis module 306 compares the name of the new or modified file with the name of known malware file names. In another example embodiment, the file naming analysis module 306 determines whether there is an increase in file renames in the folder of the data storage 206 corresponding to the folder in the client device 102. In other example embodiments, the file naming analysis module 306 monitors for text strings associated with known malware. The file naming analysis module 306 provides the malware file name matching results of the new or modified file to the impacted file identification module 310.

The content analysis module 308 determines whether a file content matches its file type (based on its extension name). For example, the content analysis module 308 determines that the content in a .jpg file is not an image. The content analysis module 308 provides its content analysis result of the new or modified file to impacted file identification module 310.

The user feedback module 312 is configured to receive feedback (e.g., confirmation and validation of the presence of malware in a new or modified file) from the client storage application 108 via the malware confirmation GUI module 316. For example, the user feedback module 312 receives a malware confirmation from the client storage application 108 based on a user feedback at the client storage application 108. The user feedback indicates whether the new or modified file is impacted with malware. The user feedback module 312 provides the user feedback (e.g., malware confirmation 220) to the learning engine 314.

The learning engine 314 (e.g., a machine learning algorithm) manages a learning model for identifying malware files. The learning engine 314 accesses file information (associated with the client device 102) from the data storage 206. The file information includes attributes, extensions, and features (including user feedback) of old, new, and modified files associated with the client device 102. Using the file information, the learning engine 314 can identify trends or patterns. For example, the learning engine 314 learns, based on file extensions, that the new file is actually not related to a malware as confirmed by the user of the client device 102 because the user has named the file to a name similar to a known malware. In another example, the learning engine 314 learns that a file that is encrypted and has a file extension name with a particular naming pattern (e.g., previously associated with existing malware) is likely a ransomware.

Based on the learning model, the learning engine 314 can, in one embodiment, suggest to the impacted file identification module 310 that the new or modified file is likely or is not likely a malware. In a further embodiment, the learning engine 202 updates a list of files that have been confirmed or validated as safe (non-impacted by malware) from the client device 102. All of the trends or patterns identified by the learning engine 314 may be stored in the data storage 206 and provided to the impacted file identification module 310 for further processing.

In other example embodiments, the learning engine 314 determines the number of files (in the account of the client device 102 in the data storage 206) being updated, deleted, created, encrypted, and with suspicious extensions, and generates a determination or confidence level that one of the files (or the user account) is impacted by a malware or malware attack.

The impacted file identification module 310 receives the results from the encryption analysis module 304, the file naming analysis module 306, the content analysis module 308, and the learning engine 314 to assess and determine whether the new or modified file is likely impacted by a malware. In example embodiments, the impacted file identification module 310 provides a range of confidence that the new or modified file is likely impacted by a malware. For example, the impacted file identification module 310 determines that a modified file is likely impacted by a malware based on a determination that the modified file is now encrypted (and an immediate previous version of the modified file was unencrypted), that the extension name of the file matches portions of text strings associated with known malware, and based on previous user feedback (from the client device or from other users or client devices with files sharing the same attributes or features).

In one example embodiment, the impacted file identification module 310 identifies suspicious files in the storage account based on the results of the encryption analysis module 304, the file naming analysis module 306, the content analysis module 308, and the learning engine 314. The impacted file identification module 310 identifies suspicious files and provides an identification of the suspicious files to the malware confirmation GUI module 316.

The malware confirmation GUI module 316 accesses the data storage 206 to retrieve metadata corresponding to the suspicious files. The malware confirmation GUI module 316 generates a GUI that identifies the suspicious files and their corresponding metadata, and requests the user of the client storage application 108 to select which of the suspicious files are indeed affected by malware. In another example embodiment, the malware confirmation GUI module 316 generates a GUI that identifies a subset of all suspicious files detected by the malware analysis engine 210. The subset may be based on a preset limited number set by the malware analysis engine 210. For example, the subset may include showing five suspicious files instead of several hundred suspicious files. The subset of suspicious files may be selected based on their corresponding metadata. For example, the subset of suspicious files may have the same user name who modified the suspicious files and/or the same period of time in which the suspicious files were modified.

Figure 4:
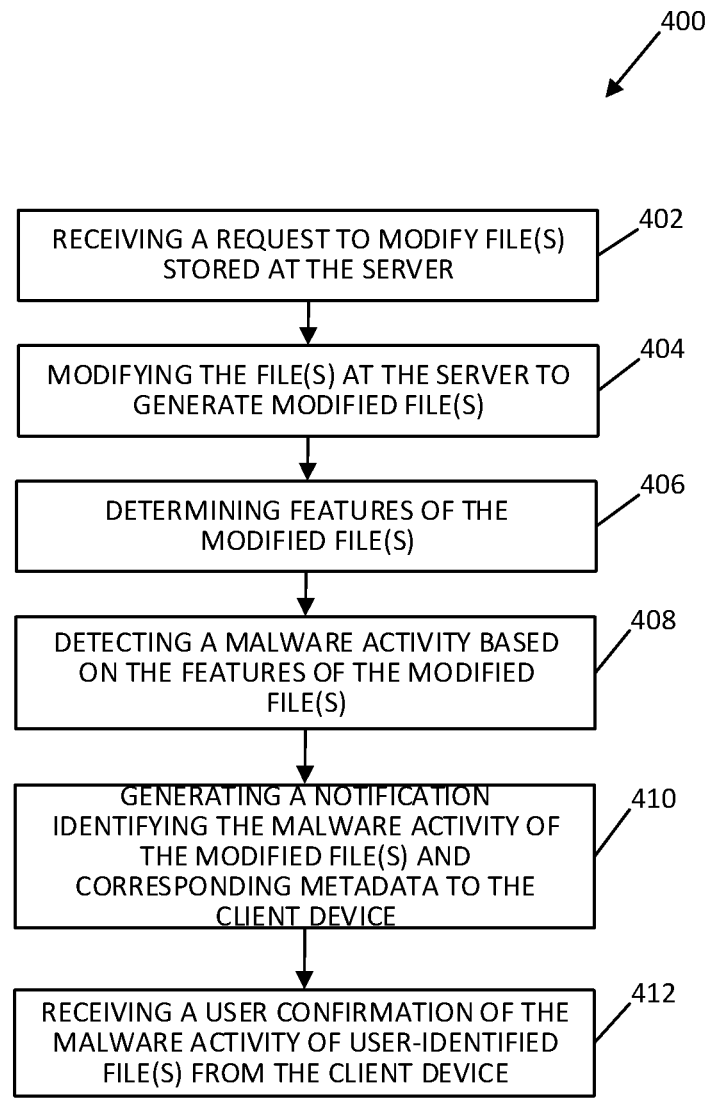
FIG. 4 is a flow diagram of a method for generating a malware activity notification, in accordance with an example embodiment.

FIG. 4 is a flow diagram of a method for detecting a malware activity, in accordance with an example embodiment. Operations in the method 400 may be performed by the storage system 106, using components (e.g., modules, engines) described above with respect to FIG. 2. Accordingly, the method 400 is described by way of example with reference to the storage system 106. However, it shall be appreciated that at least some of the operations of the method 400 may be deployed on various other hardware configurations or be performed by similar components residing elsewhere. For example, some of the operations may be performed at the client device 102.

In operation 402, the storage system 106 receives, from the client device 102, a request to modify a file stored at the storage system 106. In example embodiments, the storage system 106 stores copies of modified files from the client device 102 and receives a request to store the modified file at the storage system 106. The storage system 106 receives the request via the server storage application 202.

In response to the request, in operation 404, the server storage application 202 accesses a storage account or user data structure (e.g., files, folder, directory) for the user from the data storage 206. The data storage 206 modifies an existing file in the user data structure (associated or registered with the client device 102). The user data structure includes copies of files corresponding to a folder or directory of the client device 102 indicated by the client storage application 108.

In operation 406, the malware analysis engine 210 determines features of the modified file received at operation 402. Examples of features include an encryption status, a file or extension naming pattern, a content analysis matching result, and user feedback related to files similar to the modified file.

In operation 408, the malware analysis engine 210 detects a malware activity (e.g., ransomware) based on the features of the modified file. In another example embodiment, the malware analysis engine 210 detects a malware activity in a plurality of files in the storage account and identifies suspicious files based on the detection.

In operation 410, the notification engine 214 generates a notification that identifies the suspicious files (e.g., the modified file(s)) in the storage account as malware to the client device 102. The notification engine 214 further retrieves and identifies metadata related to the suspicious files and provides the metadata. The notification engine 214 provides a malware confirmation GUI that indicates the suspicious files (or a subset of the suspicious files) and the corresponding metadata and enable a user of the client device 102 to identify and select which of the suspicious files are impacted. In another example embodiment, the malware analysis engine 210 generates the malware confirmation GUI. The communication module 216 provides the notification (e.g., the malware confirmation GUI) to the client device 102.

In operation 412, the malware analysis engine 210 receives a user confirmation that identifies which suspicious files are impacted by malware activity. The malware analysis engine 210 receives the user confirmation from the client device 102 via the communication module 216.

Figure 5:
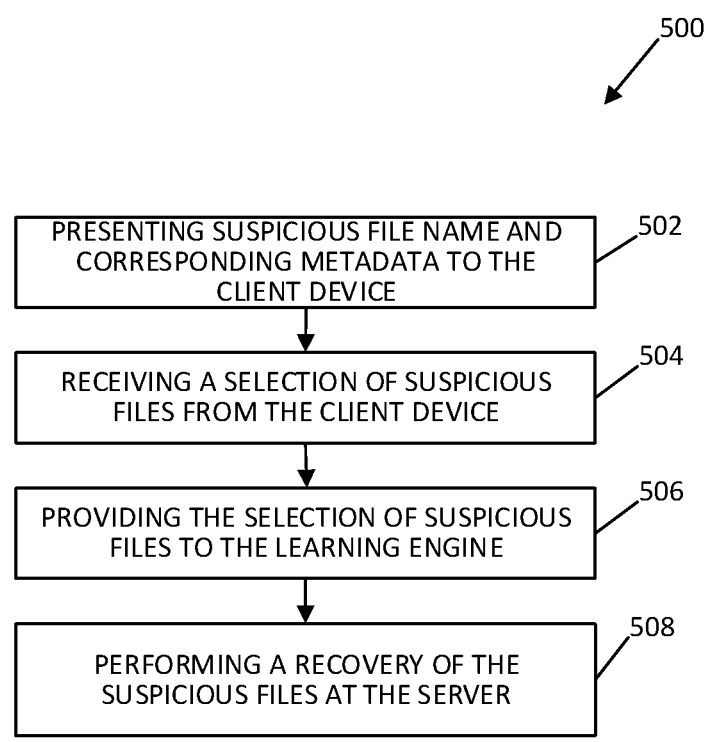
FIG. 5 is a flow diagram of a method for remediating a malware activity, in accordance with another example embodiment.

FIG. 5 is a flow diagram of a method for remediating a malware activity, in accordance with another example embodiment. Operations in the method 500 may be performed by the storage system 106 and the malware analysis engine 210, using components (e.g., modules, engines) described above with respect to FIG. 2 and FIG. 3. Accordingly, the method 500 is described by way of example with reference to the storage system 106 and the malware analysis engine 210. However, it shall be appreciated that at least some of the operations of the method 500 may be deployed on various other hardware configurations or be performed by similar components residing elsewhere. For example, some of the operations may be performed at the client device 102.

In operation 502, the storage system 106 provides names of suspicious files and corresponding metadata to the client device 102. In one example embodiment, the communication module 216 provides names of suspicious files and corresponding metadata (identified by the malware confirmation GUI module 316) to the client storage application 108.

In operation 504, the storage system 106 receives a selection of suspicious files (that are confirmed by the user of the client device 102) from the client device 102. In one example embodiment, the communication module 216 receives the selection via the GUI provided previously in operation 502.

In operation 506, the storage system 106 provides the selection of suspicious files to the learning engine 314 of the malware analysis engine 210 to train the learning engine 314. In one example embodiment, the selection of suspicious files is received via the malware confirmation GUI module 316 and the user feedback module 312.

In operation 508, the storage system 106 performs a recovery of the selected suspicious files at the data storage 206. In one example embodiment, the server storage application 202 receives the selection of suspicious files from the communication module 216 and operates on the data storage 206 to recover the selected suspicious files.

Figure 6:
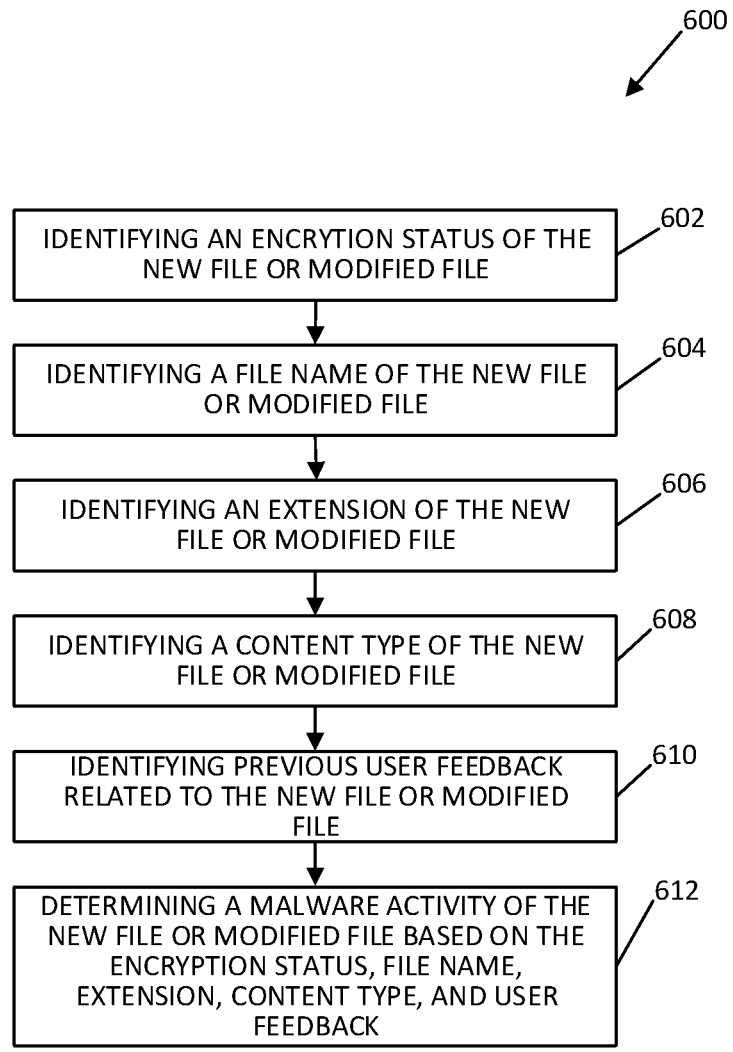
FIG. 6 is a flow diagram of a method for detecting a malware activity in a storage system, in accordance with an example embodiment.

FIG. 6 is a flow diagram of a method for determining a malware activity in a storage system, in accordance with an example embodiment. Operations in the method 600 may be performed by the storage system 106, using components (e.g., modules, engines) described above with respect to FIG. 2. Accordingly, the method 600 is described by way of example with reference to the malware analysis engine 210. However, it shall be appreciated that at least some of the operations of the method 600 may be deployed on various other hardware configurations or be performed by similar components residing elsewhere. For example, some of the operations may be performed at the client device 102.

In operation 602, the encryption analysis module 304 identifies an encryption status of the new or modified file. For example, the encryption analysis module 304 determines whether the new or modified file is encrypted (and if so, whether the immediate previous version of the file stored at the data storage 206 is unencrypted).

In operation 604, the file naming analysis module 306 identifies a file name of the new or modified file.

In operation 606, the file naming analysis module 306 identifies a file extension name of the new or modified file.

In operation 608, the content analysis module 308 identifies a content type of the new or modified file. For example, the content analysis module 308 determines what the content of the new or modified file does not match with the name extension of the new or modified file.

In operation 610, the user feedback module 312 identifies previous user feedback (or other users' feedback) related to the new or modified file.

In operation 612, the impacted file identification module 310 determines a malware activity of the new or modified file based on the encryption status, the file name, the extension, the content type, and the user's previous feedback.

Figure 7:
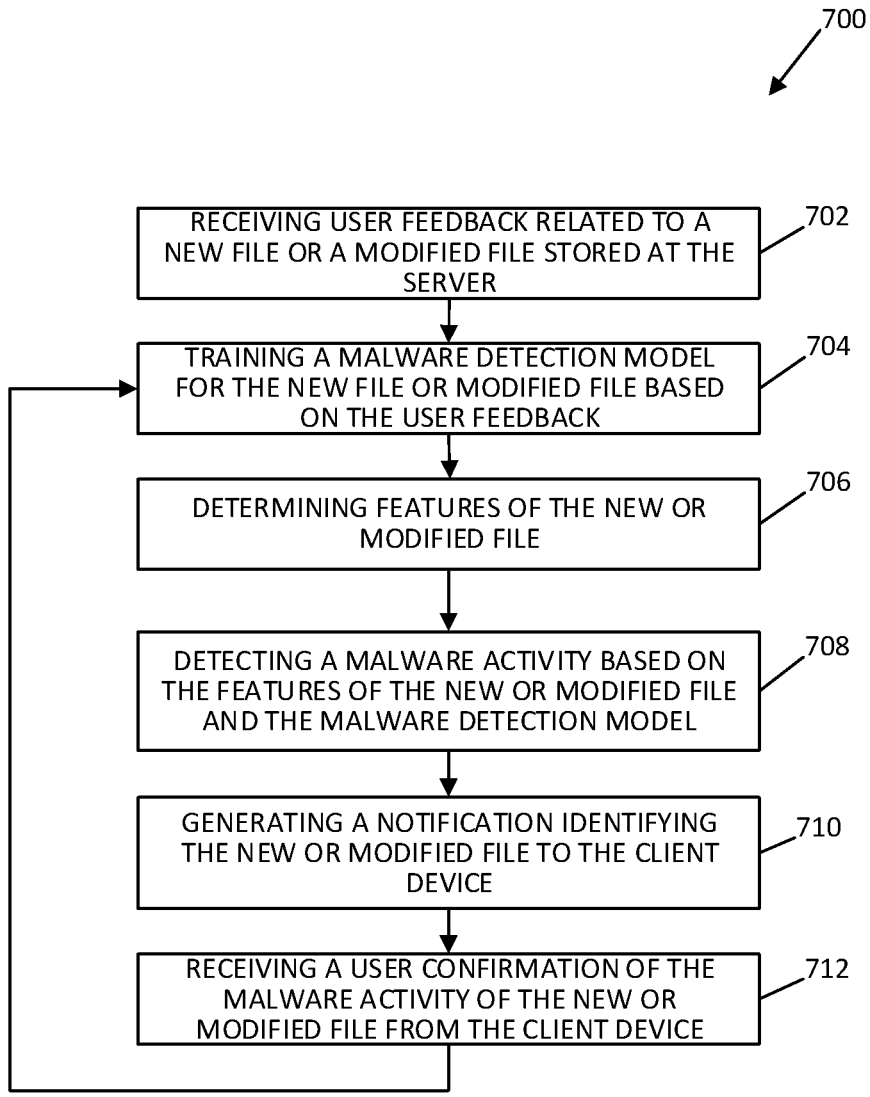
FIG. 7 is a flow diagram of a method for determining a malware activity in a storage system, in accordance with another example embodiment.

FIG. 7 is a flow diagram of a method for determining a malware activity in a storage system, in accordance with another example embodiment. Operations in the method 700 may be performed by the storage system 106, using components (e.g., modules, engines) described above with respect to FIG. 2. Accordingly, the method 700 is described by way of example with reference to the malware analysis engine 210. However, it shall be appreciated that at least some of the operations of the method 700 may be deployed on various other hardware configurations or be performed by similar components residing elsewhere. For example, some of the operations may be performed at the client device 102.

In operation 702, the user feedback module 312 receives previous user feedback (or other users feedback) related to the new or modified file stored at the storage system 106.

In operation 704, the learning engine 314 trains a malware detection model for the new or modified file based on the user's feedback.

In operation 706, the feature extraction module 302 determines features of the new or modified file. Examples of features include an encryption status, a file or extension naming pattern, a content analysis matching result, and user feedback related to files similar to the new or modified file.

In operation 708, the impacted file identification module 310 detects a malware activity (e.g., ransomware) based on the features of the new or modified file as previously determined in operation 706 and based on the malware detection model as previously determined in operation 704.

In operation 710, the notification engine 214 generates a notification that identifies the new or modified file (based on the file identification from operation 708) as potential malware to the client device 102. The communication module 216 sends the notification to the client device 102.

In operation 712, the malware analysis engine 210 receives a user confirmation of the malware activity of the modified file from the client device 102 via the communication module 216.

Figure 8:
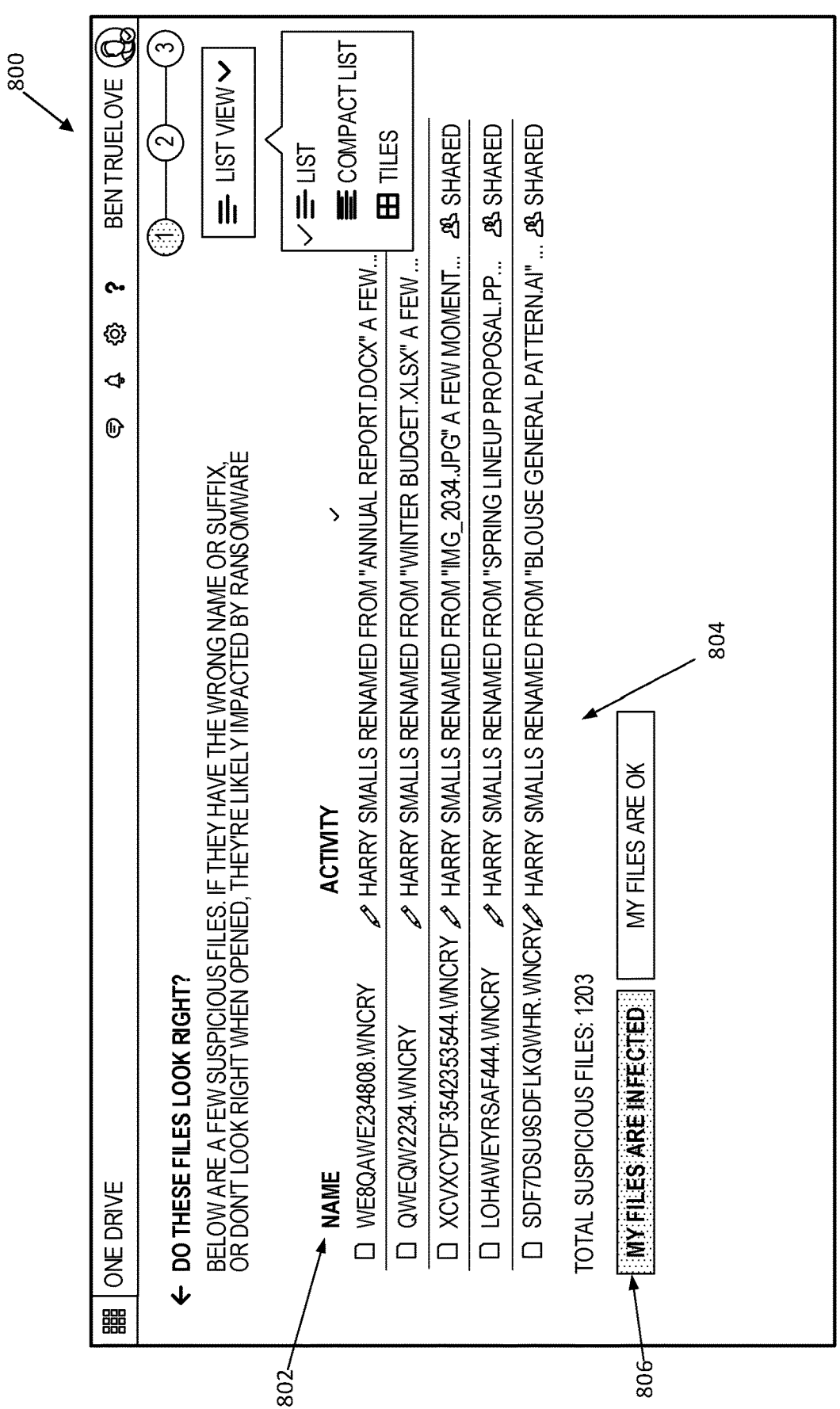
FIG. 8 is an example graphical user interface (GUI) for providing malware activity and receiving confirmation of the malware activity, in accordance with an example embodiment.

FIG. 8 is an example graphical user interface for providing malware activity and receiving confirmation of the malware activity, in accordance with an example embodiment. The GUI 800 identifies names of suspicious files 802, activity metadata 804, and confirmation button 806.

Figure 9:
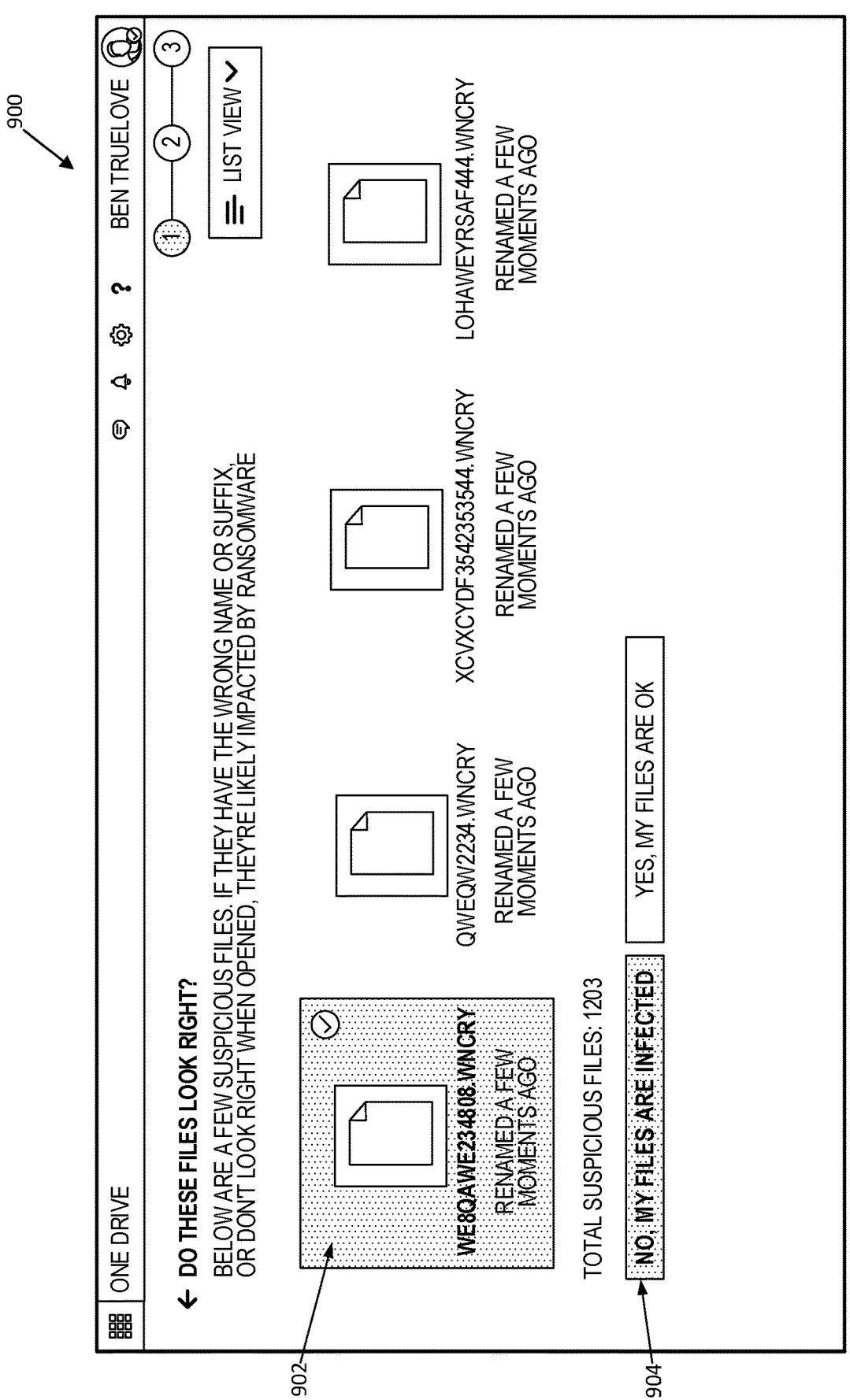
FIG. 9 is an example graphical user interface for providing malware activity and receiving confirmation of the malware activity, in accordance with an example embodiment.

FIG. 9 is an example graphical user interface for providing malware activity and receiving confirmation of the malware activity, in accordance with an example embodiment. The GUI 900 enables a user to open or download a suspicious file 902 and view the suspicious file. The GUI 900 enables the user to confirm that the suspicious files are indeed infected using the confirmation button 904 (for all presented suspicious files).

Figure 10:
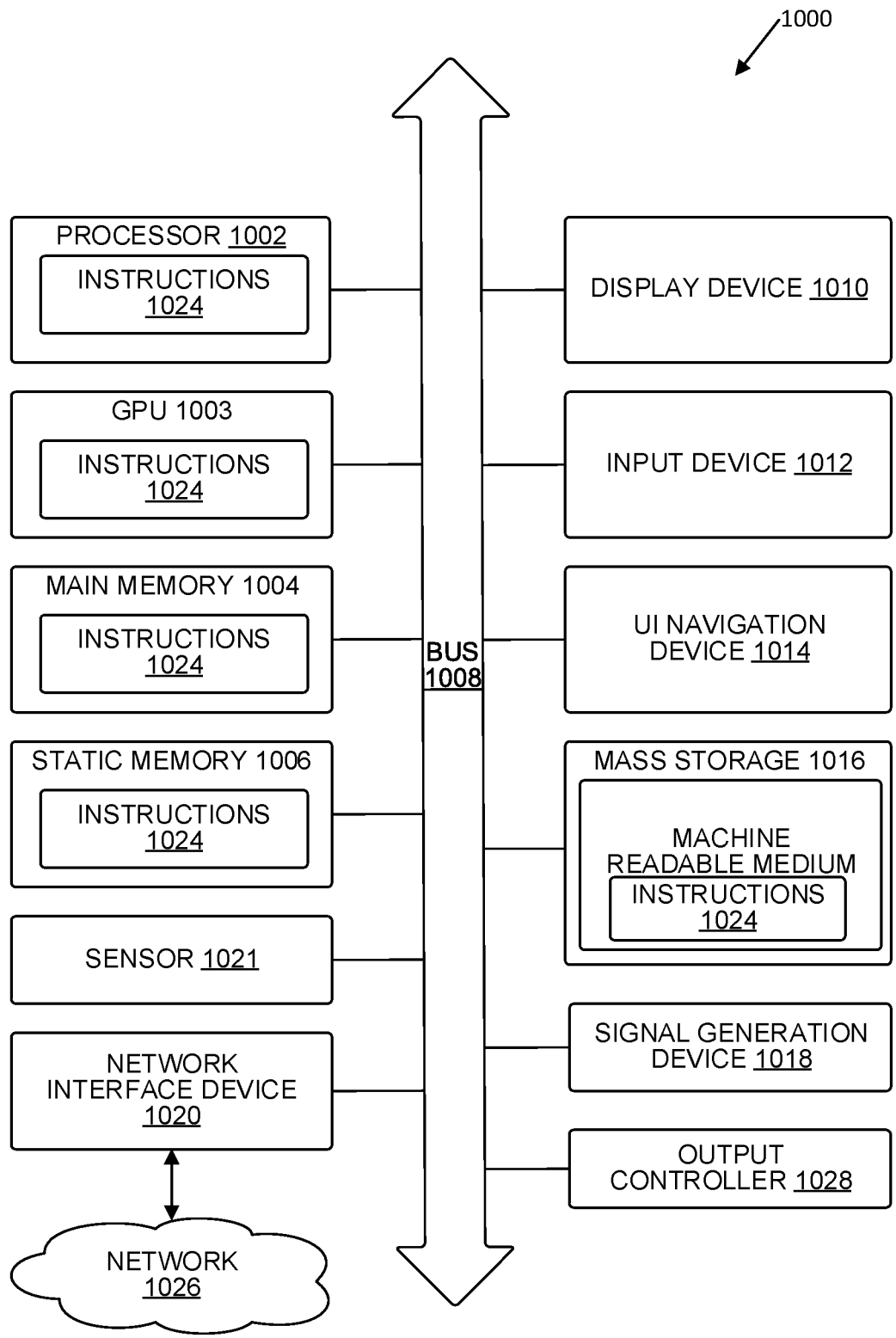
FIG. 10 is a diagrammatic representation of a machine in an example form of a computing system within which a set of instructions may be executed for causing the machine to perform any one or more of the methodologies discussed herein, according to an example embodiment.

FIG. 10 is a block diagram illustrating components of a machine 1000, according to some example embodiments, able to read instructions 1024 from a machine-storage medium 1022 and perform any one or more of the methodologies discussed herein, in whole or in part. Specifically, FIG. 10 shows the machine 1000 in the example form of a computer device (e.g., a computer) within which the instructions 1024 (e.g., software, a program, an application, an applet, an app, or other executable code) for causing the machine 1000 to perform any one or more of the methodologies discussed herein may be executed, in whole or in part.

For example, the instructions 1024 may cause the machine 1000 to execute the flows and flow diagrams of FIGS. 4-7. The instructions 1024 can transform the general, non-programmed machine 1000 into a particular machine (e.g., specially configured machine) programmed to carry out the described and illustrated functions in the manner described.

In alternative embodiments, the machine 1000 operates as a standalone device or may be connected (e.g., networked) to other machines. The machine 1000 may be a server computer, a client computer, a personal computer (PC), a tablet computer, a laptop computer, a netbook, a STB, a personal digital assistant (PDA), a cellular telephone, a smartphone, a web appliance, a network router, a network switch, a network bridge, a power adapter, or any machine 1000 capable of executing the instructions 1024, sequentially or otherwise, that specify actions to be taken by that machine 1000. Further, while only a single machine 1000 is illustrated, the term "machine" shall also be taken to include a collection of machines that individually or jointly execute the instructions 1024 to perform any one or more of the methodologies discussed herein.

The machine 1000 includes a processor 1002 (e.g., a central processing unit (CPU), a graphics processing unit (GPU) 1003, a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The processor 1002 may contain microcircuits that are configurable, temporarily or permanently, by some or all of the instructions 1024 such that the processor 1002 is configurable to perform any one or more of the methodologies described herein, in whole or in part. For example, a set of one or more microcircuits of the processor 1002 may be configurable to execute one or more modules (e.g., software modules) described herein.

The machine 1000 may further include a display device 1010 (e.g., a plasma display panel (PDP), a light-emitting diode (LED) display, a liquid crystal display (LCD), a projector, a cathode ray tube (CRT), or any other display capable of displaying graphics or video). The machine 1000 may also include an alphanumeric input device 1012 (e.g., a keyboard or keypad), a user interface (UI) navigation device 1014 (e.g., a mouse, a touchpad, a trackball, a joystick, a motion sensor, an eye tracking device, or another pointing instrument), a storage unit 1016, a signal generation device 1018 (e.g., a sound card, an amplifier, a speaker, a headphone jack, or any suitable combination thereof), a network interface device 1020, and one or more sensors 1021, such as a Global Positioning System (GPS) sensor, compass, accelerometer, or another sensor. The machine 1000 may include an output controller 1028, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.).

The storage unit 1016 includes the machine-storage medium 1022 on which are stored the instructions 1024 embodying any one or more of the methodologies or functions described herein. The instructions 1024 may also reside, completely or at least partially, within the processor 1002, the GP 1003, main memory 1004, the static memory 1006, or the machine storage medium 1022 before or during execution thereof by the machine 1000. Accordingly, the main memory 1004 and the processor 1002 may be considered machine-storage media 1022 (e.g., tangible and non-transitory machine-readable media).

In some example embodiments, the machine 1000 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a Global Positioning System (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 1004, 1006, and/or memory of the processor(s) 1002) and/or storage unit 1016 may store one or more sets of instructions and data structures (e.g., software) 1024 embodying or utilized by any one or more of the methodologies or functions described herein. These instructions, when executed by processor(s) 1002 cause various operations to implement the disclosed embodiments.

As used herein, the terms "machine-storage medium," "device-storage medium," "computer-storage medium" (referred to collectively as "machine-storage medium 1022") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1022 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 1022 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 1024 may further be transmitted or received over a communications network 1026 using a transmission medium via the network interface device 1020 and utilizing any one of a number of well-known transfer protocols (e.g., HTTP). Examples of communication networks 1026 include a LAN, a WAN, the Internet, mobile telephone networks, plain old telephone service (POTS) networks, and wireless data networks (e.g., Wi-Fi, LTE, and WiMAX networks). The term "transmission medium" or "signal medium" shall be taken to include any intangible medium that is capable of storing, encoding, or carrying instructions 1024 for execution by the machine 1000, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium 1022 or in a signal medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 1002 or a group of processors 1002) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a FPGA or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

EXAMPLES

Example 1 is a computer-implemented method comprising:
accessing, by a cloud storage server, a plurality of server-stored files of a cloud storage account of a client device;
determining that one or more server-stored files from the plurality of server-stored files are affected by a malware activity;
generating a graphical user interface that includes a detection notification and a confirmation request, the detection notification indicating a detected presence of malware in the one or more server-stored files and metadata corresponding to the one or more server-stored files, the confirmation request indicating a request for the client device to confirm the detected presence of malware in the one or more server-stored files; and
receiving a confirmation response from the client device, the confirmation response identifying at least one of the one or more server-stored files and confirming the presence of malware activity in the identified server-stored files.

In example 2, the subject matter of example 1 can optionally include, wherein the metadata comprises a server-stored file name, a server-stored extension name, a type of activity identifying a nature of a modification of a corresponding server-stored file, a name of a user who last modified a corresponding server-stored file, and a time of the modification.

In example 3, the subject matter of example 2 can optionally include, wherein the metadata comprises an identification of a subset of the one or more server-stored files, the subset identified based on one of a common server-stored extension name, a common type of activity, and a common name of the user who last modified the subset of the one or more server-stored files.

In example 4, the subject matter of example 1 can optionally include, wherein the metadata comprises an identification of a subset of the one or more server-stored files, the subset identified based a common server-stored file share attribute identifying a shared user,
wherein the method further comprises:
generating a malware notification to the shared user, the malware notification identifying the subset of the one or more server-stored files as malware impacted.

In example 5, the subject matter of example 1 can optionally include restoring the identified server-stored files to a non-compromised version of the identified server-stored files at the cloud storage server based on a time at which the identified server-stored files became affected by the malware activity at the cloud storage server.

In example 6, the subject matter of example 1 can optionally include receiving, at the cloud storage server, a request from the client device to store a file at the cloud storage server;
storing the file in a storage device of the cloud storage server;
determining features of the server-stored file;
detecting the malware activity based on the features of the server-stored file; receiving, from the client device, a malware confirmation indicating a confirmation of the presence or an absence of the malware activity in the server-stored file; and
updating an operation of the detection of the malware activity based on the received malware confirmation.

In example 7, the subject matter of example 6 can optionally include wherein determining features of the server-stored file comprises:
identifying an encryption status of the server-stored file;
identifying a name extension of the server-stored file;
identifying a content type of the server-stored file; and
identifying previous user feedback related to the server-stored file.

In example 8, the subject matter of example 7 can optionally include wherein detecting the ransomware activity comprises:
determining that the encryption status indicates that the server-stored file is encrypted and that a previous version of the server-stored file is unencrypted.
determining that the name extension or a file name of the server-stored file is indicative of the malware activity;
determining that the content type of the server-stored file does not correspond with a content associated with the name extension of the server-stored file; and determining the previous user feedback in response to previous malware notifications related to the server-stored file.

In example 9, the subject matter of example 6 can optionally include wherein updating the operation of the detecting the ransomware activity further comprises:
identifying at least one of the server-stored file name or the server-stored name extension as safe from the malware activity in response to the confirmation response indicating the absence of the malware activity in the server-stored file.

In example 10, the subject matter of example 6 can optionally include wherein updating the operation of the detection of the ransomware activity further comprises:
identifying at least one of the server-stored file name or the server-stored name extension as safe from the malware activity in response to the confirmation response indicating the absence of the malware activity in a client-stored file copy of the server-stored file.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A computer-implemented method comprising:
accessing, by a cloud storage server, a plurality of server-stored files of a cloud storage account of a client device;
determining that one or more server-stored files from the plurality of server-stored files are affected by a malware activity;
generating a graphical user interface that includes a detection notification and a confirmation request, the detection notification indicating a detected presence of malware in the one or more server-stored files and metadata corresponding to the one or more server-stored files, the metadata indicating a suspicious file renaming activity and an indication whether the one or more server-stored files are shared with other client devices registered with the cloud storage server, the confirmation request indicating a request for the client device to confirm the detected presence of malware in the one or more server-stored files;
receiving a confirmation response from the client device, the confirmation response identifying at least one of the one or more server-stored files and confirming the presence of malware activity in the identified server-stored files; and
training a malware detection model based on the confirmation response from the client device, feedback from other users or client devices with files sharing a same attribute or feature of the one or more server-stored files, features of the one or more server-stored files, and metadata corresponding to the one or more server-stored files, wherein the determining of the malware activity is based on the malware detection model.

2. The computer-implemented method of claim 1, wherein the metadata comprises a server-stored file name, a server-stored extension name, a type of activity identifying a nature of a modification of a corresponding server-stored file, a name of a user who last modified a corresponding server-stored file, and a time of the modification.

3. The computer-implemented method of claim 2, wherein the metadata comprises an identification of a subset of the one or more server-stored files, the subset identified based on one of a common server-stored extension name, a common type of activity, and a common name of the user who last modified the subset of the one or more server-stored files.

4. The computer-implemented method of claim 1, wherein the metadata comprises an identification of a subset of the one or more server-stored files, the subset identified based on a common server-stored file share attribute identifying a shared user,
wherein the method further comprises:
generating a malware notification to the shared user, the malware notification identifying the subset of the one or more server-stored files as malware impacted.

5. The computer-implemented method of claim 1, comprising:
restoring the identified server-stored files to a non-compromised version of the identified server-stored files at the cloud storage server based on a time at which the identified server-stored files became affected by the malware activity at the cloud storage server.

6. The computer-implemented method of claim 1, comprising:
receiving, at the cloud storage server, a request from the client device to store a file at the cloud storage server;
storing the file in a storage device of the cloud storage server;
determining features of the server-stored file;
detecting the malware activity based on the features of the server-stored file, receiving, from the client device, a malware confirmation indicating a confirmation of the presence of the malware activity in the server-stored file; and
updating an operation of the detection of the malware activity based on the received malware confirmation.

7. The computer-implemented method of claim 6, wherein determining features of the server-stored file comprises:
identifying an encryption status of the server-stored file;
identifying a name extension of the server-stored file;
identifying a content type of the server-stored file; and
identifying a previous user feedback related to the server-stored file.

8. The computer-implemented method of claim 7, further comprising:
determining that the encryption status indicates that the server-stored file is encrypted and that a previous version of the server-stored file is unencrypted;
determining that the name extension or a file name of the server-stored file is indicative of the malware activity;
determining that the content type of the server-stored file does not correspond with a content associated with the name extension of the server-stored file; and
determining the previous user feedback in response to previous malware notifications related to the server-stored file.

9. The computer-implemented method of claim 6, wherein updating the operation of the detecting the malware activity further comprises:
identifying at least one of the server-stored file name or the server-stored name extension as safe from the malware activity in response to the confirmation response indicating an absence of the malware activity in the server-stored file.

10. The computer-implemented method of claim 6, wherein updating the operation of the detection of the malware activity further comprises:
identifying at least one of the server-stored file name or the server-stored name extension as safe from the malware activity in response to the confirmation response indicating the absence of the malware activity in a client-stored file copy of the server-stored file.

11. A system comprising:
one or more hardware processors; and
a memory storing instructions that, when executed by the one or more hardware processors, cause the one or more hardware processors to perform operations comprising:
accessing, by a cloud storage server, a plurality of server-stored files of a cloud storage account of a client device;
determining that one or more server-stored files from the plurality of server-stored files are affected by a malware activity;
generating a graphical user interface that includes a detection notification and a confirmation request, the detection notification indicating a detected presence of malware in the one or more server-stored files and metadata corresponding to the one or more server-stored files, the metadata indicating a suspicious file renaming activity and an indication whether the one or more server-stored files are shared with other client devices registered with the cloud storage server, the confirmation request indicating a request for the client device to confirm the detected presence of malware in the one or more server-stored files;
receiving a confirmation response from the client device, the confirmation response identifying at least one of the one or more server-stored files and confirming the presence of malware activity in the identified server-stored files; and
training a malware detection model based on the confirmation response from the client device, feedback from other users or client devices with files sharing a same attribute or feature of the one or more server-stored files, features of the one or more server-stored files, and metadata corresponding to the one or more server-stored files, wherein the determining of the malware activity is based on the malware detection model.

12. The system of claim 11, wherein the metadata comprises a server-stored file name, a server-stored extension name, a type of activity identifying a nature of a modification of a corresponding server-stored file, a name of a user who last modified a corresponding server-stored file, and a time of the modification.

13. The system of claim 12, wherein the metadata comprises an identification of a subset of the one or more server-stored files, the subset identified based on one of a common server-stored extension name, a common type of activity, and a common name of the user who last modified the subset of the one or more server-stored files.

14. The system of claim 11, wherein the metadata comprises an identification of a subset of the one or more server-stored files, the subset identified based on a common server-stored file share attribute identifying a shared user,
   wherein the operations further comprise:
      generating a malware notification to the shared user, the malware notification identifying the subset of the one or more server-stored files as malware impacted.

15. The system of claim 11, wherein the operations further comprise:
   restoring the identified server-stored files to a non-compromised version of the identified server-stored files at the cloud storage server based on a time at which the identified server-stored files became affected by the malware activity at the cloud storage server.

16. The system of claim 11, wherein the operations further comprise:
   receiving, at the cloud storage server, a request from the client device to store a file at the cloud storage server;
   storing the file in a storage device of the cloud storage server;
   determining features of the server-stored file;
   detecting the malware activity based on the features of the server-stored file, receiving, from the client device, a malware confirmation indicating a confirmation of the presence or an absence of the malware activity in the server-stored file; and
   updating an operation of the detection of the malware activity based on the received malware confirmation.

17. The system of claim 16, wherein determining features of the server-stored file comprises:
   identifying an encryption status of the server-stored file;
   identifying a name extension of the server-stored file;
   identifying a content type of the server-stored file; and
   identifying a previous user feedback related to the server-stored file.

18. The system of claim 17, wherein detecting the malware activity comprises:
   determining that the encryption status indicates that the server-stored file is encrypted and that a previous version of the server-stored file is unencrypted;
   determining that the name extension or a file name of the server-stored file is indicative of the malware activity;
   determining that the content type of the server-stored file does not correspond with a content associated with the name extension of the server-stored file; and
   determining the previous user feedback in response to previous malware notifications related to the server-stored file.

19. The system of claim 16, wherein updating the operation of the detecting the malware activity further comprises:
   identifying at least one of the server-stored file name or the server-stored name extension as safe from the malware activity in response to the confirmation response indicating the absence of the malware activity in the server-stored file.

20. A machine-storage medium storing instructions that, when executed by one or more processors of a machine, cause the one or more processors to perform operations comprising:
   accessing, by a cloud storage server, a plurality of server-stored files of a cloud storage account of a client device;
   determining that one or more server-stored files from the plurality of server-stored files are affected by a malware activity;
   generating a graphical user interface that includes a detection notification and a confirmation request, the detection notification indicating a detected presence of malware in the one or more server-stored files and metadata corresponding to the one or more server-stored files, the metadata indicating a suspicious file renaming activity and an indication whether the one or more server-stored files are shared with other client devices registered with the cloud storage server, the confirmation request indicating a request for the client device to confirm the detected presence of malware in the one or more server-stored files;
   receiving a confirmation response from the client device, the confirmation response identifying at least one of the one or more server-stored files and confirming the presence of malware activity in the identified server-stored files; and
   training a malware detection model based on the confirmation response from the client device, feedback from other users or client devices with files sharing a same attribute or feature of the one or more server-stored files, features of the one or more server-stored files, and metadata corresponding to the one or more server-stored files, wherein the determining of the malware activity is based on the malware detection model.

* * * * *